US008628408B2

(12) United States Patent
Popovich et al.

(10) Patent No.: US 8,628,408 B2
(45) Date of Patent: Jan. 14, 2014

(54) RETURN-DRIVEN CASINO GAME OUTCOME GENERATOR

(75) Inventors: Alexander Popovich, Henderson, NV (US); Cameron Anthony Filipour, Las Vegas, NV (US); Adam Singer, Henderson, NV (US); Thierry Brunet de Courssou, Henderson, NV (US)

(73) Assignee: IGT, Las Vegas, NV (US)

( * ) Notice: Subject to any disclaimer, the term of this patent is extended or adjusted under 35 U.S.C. 154(b) by 1455 days.

(21) Appl. No.: 12/110,132

(22) Filed: Apr. 25, 2008

(65) Prior Publication Data

US 2009/0061998 A1 Mar. 5, 2009

Related U.S. Application Data

(60) Provisional application No. 60/969,137, filed on Aug. 30, 2007.

(51) Int. Cl.

| | |
|---|---|
| ***A63F 13/00*** | (2006.01) |
| ***A63F 13/06*** | (2006.01) |
| *A63F 13/10* | (2006.01) |
| *A63F 9/00* | (2006.01) |

(52) U.S. Cl.
USPC .......... 463/25; 463/7; 463/9; 463/10; 463/16; 463/20; 463/21; 463/22; 463/23

(58) Field of Classification Search
USPC ............................ 463/25, 7, 9–10, 16, 20–23
See application file for complete search history.

(56) References Cited

U.S. PATENT DOCUMENTS 4,593,904 A 6/1986 Graves
4,618,150 A * 10/1986 Kimura .................... 273/143 R
4,695,053 A 9/1987 Vazquez, Jr. et al.
5,271,628 A * 12/1993 Okada .......................... 273/448
5,342,049 A * 8/1994 Wichinsky et al. ....... 273/119 R
5,823,873 A 10/1998 Moody
5,882,261 A * 3/1999 Adams ........................... 463/20
6,012,983 A 1/2000 Walker et al.
6,019,374 A 2/2000 Breeding
6,050,895 A * 4/2000 Luciano et al. .................. 463/7

(Continued)

OTHER PUBLICATIONS

Written Opinion and International Search Report of the International Searching Authority in corresponding PCT application PCT/US08/74256, mailed Nov. 19, 2008.

*Primary Examiner* — William H McCulloch, Jr.
(74) *Attorney, Agent, or Firm* — Neal, Gerber & Eisenberg LLP

(57) ABSTRACT

The Return Driven Casino Game Outcome Generator makes the first true class of casino video game possible by creating games that measure and reward skills like fast reflexes and manual dexterity while earning consistent and reliable profits for game operators. An RDOG gaming machine may include a game that includes a reward generating assets and a graphic shown on a display. The graphic is at least partially controlled by the player and configured to interact with the reward generating asset. A reward table is associated with the reward generating assets and is configured such that when the graphic successfully interacts therewith on the display, a random number is obtained and used as an index into the reward table to derive a reward multiplier. The reward due the player for successfully interacting with the reward generating asset may then be determined by a product of the reward multiplier and a collision wager that is dependent upon a time interval since a last successful interaction with the reward generating asset.

19 Claims, 10 Drawing Sheets

(56) References Cited

U.S. PATENT DOCUMENTS

| | | | | |
|---|---|---|---|---|
| 6,077,163 | A | 6/2000 | Walker et al. | |
| 6,244,957 | B1 * | 6/2001 | Walker et al. | 463/20 |
| 6,248,016 | B1 * | 6/2001 | Walker et al. | 463/13 |
| 6,267,669 | B1 * | 7/2001 | Luciano et al. | 463/7 |
| 6,283,474 | B1 | 9/2001 | de Keller | |
| 6,319,127 | B1 * | 11/2001 | Walker et al. | 463/26 |
| 6,409,597 | B1 | 6/2002 | Mizumoto | |
| 6,413,160 | B1 | 7/2002 | Vancura | |
| 6,503,146 | B2 | 1/2003 | Walker et al. | |
| 6,517,433 | B2 * | 2/2003 | Loose et al. | 463/20 |
| 6,522,312 | B2 | 2/2003 | Ohshima et al. | |
| 6,572,473 | B1 | 6/2003 | Baerlocher | |
| 6,599,192 | B1 * | 7/2003 | Baerlocher et al. | 463/25 |
| 6,645,075 | B1 * | 11/2003 | Gatto et al. | 463/25 |
| 6,666,765 | B2 | 12/2003 | Vancura | |
| 6,719,631 | B1 * | 4/2004 | Tulley et al. | 463/17 |
| 6,746,016 | B2 | 6/2004 | Perrie et al. | |
| 6,752,717 | B2 | 6/2004 | Vancura | |
| 6,758,750 | B2 * | 7/2004 | Baerlocher et al. | 463/25 |
| 6,761,632 | B2 * | 7/2004 | Bansemer et al. | 463/16 |
| 6,780,103 | B2 | 8/2004 | Bansemer et al. | |
| 6,811,482 | B2 * | 11/2004 | Letovsky | 463/7 |
| 6,852,027 | B2 | 2/2005 | Kaminkow et al. | |
| 6,852,030 | B2 * | 2/2005 | Baerlocher et al. | 463/25 |
| 6,863,606 | B1 | 3/2005 | Berg et al. | |
| 6,884,167 | B2 * | 4/2005 | Walker et al. | 463/20 |
| 6,918,830 | B2 | 7/2005 | Baerlocher | |
| 6,942,568 | B2 | 9/2005 | Baerlocher | |
| 6,984,174 | B2 | 1/2006 | Cannon et al. | |
| 6,988,732 | B2 | 1/2006 | Vancura | |
| 7,056,210 | B2 | 6/2006 | Bansemer et al. | |
| 7,073,793 | B2 | 7/2006 | Vancura | |
| 7,077,744 | B2 | 7/2006 | Cannon | |
| 7,140,964 | B2 * | 11/2006 | Walker et al. | 463/25 |
| 7,175,521 | B2 | 2/2007 | McClintic | |
| 7,175,524 | B2 | 2/2007 | Bansemer et al. | |
| 7,192,346 | B2 * | 3/2007 | Mathis | 463/20 |
| 7,217,187 | B2 | 5/2007 | Vancura | |
| 7,234,700 | B2 | 6/2007 | Vancura | |
| 7,326,115 | B2 | 2/2008 | Baerlocher | |
| 7,572,182 | B2 | 8/2009 | Vancura | |
| 7,658,673 | B2 * | 2/2010 | Baerlocher et al. | 463/16 |
| 7,682,239 | B2 * | 3/2010 | Friedman et al. | 463/16 |
| 7,686,303 | B2 | 3/2010 | Kaminkow et al. | |
| 7,722,461 | B2 * | 5/2010 | Gatto et al. | 463/25 |
| 7,749,062 | B2 * | 7/2010 | Gatto et al. | 463/16 |
| 7,789,749 | B2 | 9/2010 | Bansemer et al. | |
| 7,846,015 | B2 * | 12/2010 | Bansemer et al. | 463/16 |
| 7,905,773 | B2 * | 3/2011 | Moffett et al. | 463/20 |
| 7,914,372 | B2 * | 3/2011 | Tessmer et al. | 463/20 |
| 7,931,531 | B2 * | 4/2011 | Oberberger | 463/25 |
| 7,950,993 | B2 * | 5/2011 | Oberberger | 463/16 |
| 7,955,169 | B2 * | 6/2011 | Walker et al. | 463/16 |
| 7,963,839 | B2 * | 6/2011 | Gatto et al. | 463/16 |
| 7,963,845 | B2 * | 6/2011 | Baerlocher | 463/25 |
| 7,967,674 | B2 * | 6/2011 | Baerlocher | 463/16 |
| 7,980,942 | B2 * | 7/2011 | Kane | 463/18 |
| 8,007,358 | B2 * | 8/2011 | Linard et al. | 463/20 |
| 8,021,222 | B2 * | 9/2011 | Walker et al. | 463/13 |
| 8,033,904 | B2 * | 10/2011 | Gatto et al. | 463/16 |
| 8,038,529 | B2 * | 10/2011 | Kane et al. | 463/29 |
| 8,056,900 | B2 * | 11/2011 | Bozeman | 273/138.1 |
| 8,062,127 | B2 * | 11/2011 | Filipour et al. | 463/30 |
| 8,070,581 | B2 * | 12/2011 | Linard et al. | 463/16 |
| 8,075,383 | B2 * | 12/2011 | Friedman et al. | 463/16 |
| 8,113,936 | B2 * | 2/2012 | Filipour et al. | 463/16 |
| 8,113,938 | B2 * | 2/2012 | Friedman et al. | 463/16 |
| 8,235,808 | B2 * | 8/2012 | Baerlocher et al. | 463/26 |
| 8,308,550 | B2 * | 11/2012 | Filipour et al. | 463/20 |
| 8,337,300 | B2 * | 12/2012 | Bowers et al. | 463/25 |
| 8,360,854 | B2 * | 1/2013 | Popovich et al. | 463/23 |
| 8,398,475 | B2 * | 3/2013 | De Waal et al. | 463/16 |
| 8,430,735 | B2 | 4/2013 | Oberberger | |
| 8,435,111 | B2 * | 5/2013 | Filipour et al. | 463/20 |
| 2002/0019253 | A1 * | 2/2002 | Reitzen et al. | 463/16 |
| 2002/0036380 | A1 | 3/2002 | Perrie et al. | |
| 2002/0037767 | A1 * | 3/2002 | Ebin | 463/25 |
| 2002/0123379 | A1 * | 9/2002 | Yamazaki et al. | 463/22 |
| 2002/0132660 | A1 | 9/2002 | Taylor | |
| 2002/0147040 | A1 | 10/2002 | Walker et al. | |
| 2003/0027617 | A1 | 2/2003 | Vancura | |
| 2003/0027619 | A1 * | 2/2003 | Nicastro, Sr. | 463/16 |
| 2003/0064794 | A1 * | 4/2003 | Mead et al. | 463/25 |
| 2003/0069053 | A1 * | 4/2003 | Dovgan | 463/6 |
| 2003/0171140 | A1 | 9/2003 | Gatto et al. | |
| 2003/0199294 | A1 * | 10/2003 | Walker et al. | 463/13 |
| 2003/0199305 | A1 * | 10/2003 | Mathis | 463/20 |
| 2003/0199314 | A1 * | 10/2003 | Baerlocher et al. | 463/25 |
| 2003/0211881 | A1 | 11/2003 | Walker et al. | |
| 2004/0009805 | A1 * | 1/2004 | Baerlocher et al. | 463/16 |
| 2004/0102238 | A1 * | 5/2004 | Taylor | 463/16 |
| 2004/0185929 | A1 * | 9/2004 | Walker et al. | 463/16 |
| 2004/0214644 | A1 * | 10/2004 | Emori et al. | 463/46 |
| 2004/0235551 | A1 * | 11/2004 | Walker et al. | 463/16 |
| 2004/0242319 | A1 * | 12/2004 | Walker et al. | 463/25 |
| 2005/0130729 | A1 * | 6/2005 | Baerlocher et al. | 463/16 |
| 2005/0181853 | A1 | 8/2005 | Baerlocher | |
| 2005/0192087 | A1 * | 9/2005 | Friedman et al. | 463/25 |
| 2005/0239538 | A1 * | 10/2005 | Dixon | 463/20 |
| 2006/0025207 | A1 * | 2/2006 | Walker et al. | 463/25 |
| 2007/0129128 | A1 | 6/2007 | McClintic | |
| 2008/0015004 | A1 * | 1/2008 | Gatto et al. | 463/16 |
| 2008/0108406 | A1 | 5/2008 | Oberberger | |
| 2008/0274798 | A1 * | 11/2008 | Walker et al. | 463/25 |
| 2008/0311980 | A1 | 12/2008 | Cannon | |
| 2009/0036199 | A1 * | 2/2009 | Myus et al. | 463/23 |
| 2009/0061991 | A1 * | 3/2009 | Popovich et al. | 463/25 |
| 2009/0061997 | A1 * | 3/2009 | Popovich et al. | 463/26 |
| 2009/0061998 | A1 * | 3/2009 | Popovich et al. | 463/26 |
| 2009/0061999 | A1 * | 3/2009 | Popovich et al. | 463/26 |
| 2009/0131158 | A1 * | 5/2009 | Brunet De Courssou et al. | 463/26 |
| 2009/0270163 | A1 * | 10/2009 | Mitelman | 463/20 |
| 2009/0280891 | A1 * | 11/2009 | Filipour et al. | 463/22 |
| 2010/0004060 | A1 * | 1/2010 | Filipour et al. | 463/30 |
| 2010/0009742 | A1 * | 1/2010 | Popovich et al. | 463/25 |
| 2010/0056243 | A1 * | 3/2010 | Czyzewski et al. | 463/16 |
| 2010/0160030 | A1 * | 6/2010 | Indrakumar | 463/20 |
| 2010/0184507 | A1 | 7/2010 | Gatto et al. | |
| 2010/0227662 | A1 * | 9/2010 | Speer et al. | 463/16 |
| 2011/0218024 | A1 | 9/2011 | Baerlocher | |
| 2011/0300949 | A1 * | 12/2011 | Filipour et al. | 463/43 |

* cited by examiner

| Milestone Interval | RTP |
|---|---|
| > 1 minute | 92 |
| 50-59 seconds | 94 |
| < 50 seconds | 96 |

| Average Speed | RTP |
|---|---|
| < 120 mph | 92 |
| 120 – 150 mph | 94 |
| > 150 mph | 96 |

716

| Aliens Destroyed per Life | RTP |
|---|---|
| 0 -- 15 Aliens | 92 |
| 15 – 40 Aliens | 94 |
| > 40 Aliens | 96 |

RETURN-DRIVEN CASINO GAME OUTCOME GENERATOR

CROSS-REFERENCE TO RELATED APPLICATIONS

This application claims priority under 35 U.S.C. §119(e) of Provisional Application No. 60/969,137, filed Aug. 30, 2007, which application is hereby incorporated herein by reference in its entirety. This application is related in subject matter to application Ser. No. 10/167,052, filed Jun. 10, 2002, now U.S. Pat. No. 6,645,075, and three patent applications filed on even date herewith and identified as application Ser. Nos. 12/110,112, 12/110,125, and 12/110,140 (issued as U.S. Pat. No. 8,360,854 on Jan. 29, 2013), which applications are hereby incorporated herein by reference in their entireties.

BACKGROUND OF THE INVENTION

1. Field of the Invention

The present inventions relate generally to the field of regulated pay computer-controlled games, either games of skills or games of chance.

2. Description of the Prior Art and Related Information

Electronic games of chance of the present day rely heavily on gambling's inherent tension to entertain players. This is to say that, other than the uncertainty surrounding whether a wager will result in the winning or losing of funds, such games offer the player little in the way of entertainment. Most slot machines, for example, feature repetitive wagering sequences in which there is no significant decision-making, no skill exhibited, and no building sense of purpose from one action to the next.

Casino video poker games have an advantage over video slot machines in that they allow the player to make real decisions with real consequences. These decisions, however, have fairly clear-cut solutions and are repetitive in nature—limitations that undercut much of the entertainment value they provide. It should also be noted that while the graphics and effects used within video slot machines have improved sharply within the past decade and thus contributed to those games' entertainment value, the visual effects used in video poker games have remained primitive.

Electronic games released for the home video game market feature elements of skill-based play that have long proved entertaining to players but that have not been widely used within the casino environment. These video games accurately measure and reward skills like rapid decision making, good hand-eye coordination, and manual dexterity such that players feel a correlation between their performance within the game and the results achieved. These games also allow players to experience a rising sense of excitement by providing them with goals and objectives within the game—such as completing tasks and advancing through "levels"—that give the gaming experience a greater feeling of purpose and meaning.

With the advent of the 21st century, slot machine manufacturers have come to realize the value of creating games that are attractive to an emerging generation of video-game savvy players. Bally Technologies has recently appealed to the home video gamers' sense of nostalgia by incorporating themes and icons from classic video games like Atari's Pong® into video slot machines. The Pong® game is essentially a traditional video slot machine that uses symbols taken from the classic Pong® arcade game, although players who randomly win a trip into the game's bonus round do get to demonstrate their skill in a 45 second bonus video game.

Pong® and other such slot-based games are unlikely to capture the attention of the home video game player for one key reason: a standard slot machine dressed up with video game themes and icons and an interactive bonus round is still, at its core, a slot machine. A generation of players who grew up fighting aliens, driving race cars, rescuing princesses and slaying dragons, all in brilliant graphics and sounds, is never going to be fully engaged by a game that derives its primary excitement from the player passively watching spinning reels.

Instead, this newer generation of player will demand casino games that measure real skill and that reward fast reflexes and good decision making. Players will not be satisfied with snippets of simulated video game play that occur only in secondary bonus games; they will demand arcade-style excitement from the moment their game begins until the moment it ends.

The challenge of developing an electronic casino game that rewards true skill from start to finish and yet returns a reliable yield to the game operator has, thus far, been unsolved by casino game manufacturers. From the foregoing, it may be appreciated that there has been a long felt need for games, gaming methods and gaming machines that offer both rewarding continuous arcade-style game play to the player and predictable profits to the game operator.

SUMMARY OF THE INVENTION

Games in which the return to player (RTP) is static cannot reward true skill, while games that are purely skill-driven cannot guarantee the operator profitability. The Return Driven Casino Game Outcome Generator according to embodiments of the present invention allows for the creation of the first class of true casino video games, meaning regulated games that both measure and reward the player's true skill and that hold a consistent and reliable percentage of funds wagered for the house. The present Return Driven Casino Game Outcome Generator is configured to deliver an authentic video game experience where other casino video game paradigms have failed because: 1) it makes skill-based, arcade-style play possible from the start of a game to its finish; 2) it may leverage Cyberview Technology, Inc.'s "Cashless Time Gaming" U.S. Pat. No. 6,645,075, to naturally and seamlessly transition scoring events that occur within a video game into opportunities for players to win funds; and 3) it turns the existing paradigm of casino game returns upside down, allowing the game to unfold in such a manner that is both truly random and governed by the game's predetermined RTP range.

Players wagering within a regulated game environment of a gaming machine featuring an embodiment of the present the Return Driven Outcome Generator may purchase the opportunity to compete in arcade-style play via a time-based contract. As the player initiates game play, each or selected "key event" within the game (i.e., positive events that would typically lead to the player scoring points in a non-wagering version of the game) may cause the game to reference a specific reward table associated with that event in a process that may lead, through calling the game's random number generator, to the player winning funds. Different classes of reward-triggering events within a game may or may not be associated with different reward tables. Players may be graded based upon the skill level they exhibit during game play within the regulated gaming environment such that players with above average skill may earn, on average, higher rewards. Skilled players may also positively affect their destiny by causing the Outcome Generator to create more favorable future in-game scenarios that reward their skill.

Accordingly, an embodiment of the present invention is a method of determining a reward due to a player of a regulated game. Such a method may include steps of enabling the player to interact with at least one reward generating asset within the regulated game; measuring a level of skill of the player in interacting with the at least one reward generating asset, and determining the reward due to the player for each successful interaction with the at least one reward generating asset, the reward being determined according to the measured skill level, a random number and a time elapsed since a last successful interaction with any one of the at least one reward generating asset.

According to further embodiments, the determining step may be carried out with the reward being comparatively smaller on average when the time elapsed is smaller than when the time elapsed is larger. The determining step may be carried out with the measured skill level determining an average RTP percentage of the regulated game. The determining step may be carried out with higher measured skill levels being associated with comparatively higher average RTP percentages than lower measured skill levels. The method may further include steps of selling to the player a contract of play time of a predetermined duration in the regulated game for a predetermined cost, and at least the enabling and determining steps may be carried out as long as the predetermined duration has not elapsed. The method may further include a step of computing a cost per unit of time of the contract by dividing the cost of the contract by the duration of the contract. The determining step may be carried out with the reward due to the player for each successful interaction with the at least one reward generating asset also being determined according to the cost per unit of time of the contract.

According to another embodiment thereof, the present invention is also a regulated gaming machine. The regulated gaming machine may include a display; a source of random numbers; at least one reward generating asset shown on the display, the at least one reward generating asset being configured to enable a player of the regulated gaming machine to interact therewith, the regulated gaming machine may be configured to measure a level of skill of the player in interacting with the at least one reward generating asset, the regulated gaming being further configured to determine the reward due to the player for each successful interaction with the at least one reward generating asset, the reward being determined according to the measured skill level, a random number obtained from the source of random numbers and a time elapsed since a last successful interaction with any one of the at least one reward generating asset.

The regulated gaming machine may be further configured such that the reward may be comparatively smaller on average when the time elapsed is smaller than when the time elapsed is larger. The measured skill level may determine an average RTP percentage of the regulated gaming machine. According to some embodiments, higher measured skill levels may be associated with comparatively higher average RTP percentages than lower measured skill levels. The regulated gaming machine may be further configured to sell to the player a contract of play time of a predetermined duration for a predetermined cost, and at least the enabling and determining steps may be carried out as long as the predetermined duration has not elapsed. The regulated gaming machine may be further configured to compute a cost per unit of time of the contract by dividing the cost of the contract by the duration of the contract. The regulated gaming machine may be further configured to also determine the reward due to the player for each successful interaction with the at least one reward generating asset according to the cost per unit of time of the contract.

According to yet another embodiment thereof, the present invention is a regulated multi-level game of chance. The regulated multi-level game of chance may include a source of random numbers; a first game level, the first game level including a plurality of first reward generating assets, a successful interaction with any one of the first reward generating assets generating a first reward, the first reward being dependent upon a first random number obtained from the source of random numbers and a time elapsed since a last successful interaction with any one of the first reward generating assets, and a second game level, the second game level including a plurality of second reward generating assets, a successful interaction with any one of the second reward generating assets generating a second reward, the second reward being dependent upon a second random number obtained from the source of random numbers and a time elapsed since a last successful interaction with any one of the second reward generating assets, a second average RTP percentage of the second level may be comparatively higher than a first average RTP percentage of the first level.

The game may be configured to determine a level of skill of a player of the game in the first game level, and the game may be further configured to allow the player to play the second level only when the determined level of skill reaches a predetermined threshold. The game may also include successively higher numbered game levels, each having with progressively higher average RTP percentages, and each accessible to the player upon being determined to have reached progressively higher levels of skill. For example, the regulated game may be configured as a first person shooter. Alternatively, the game levels may include a scripted narrative. The first reward generating assets of the first game level may be configured to return, on average, lower rewards upon successful player interaction therewith than may be returned upon successful player interaction with the second reward generating assets of the second game level.

The regulated game may further include a first reward table associated with the first reward generating assets, the first reward table including a first reward multiplier probability distribution and a corresponding range of first reward multipliers, the first reward generating assets being configured such that, upon successful player interaction therewith, the first random number may be used as a first index into the first reward multiplier probability distribution to obtain a corresponding first reward multiplier within the range of first reward multipliers and the first reward due may be a product of the first reward multiplier and a first collision wager that may be dependent upon the time elapsed since the last successful interaction with any of the first reward generating assets.

Similarly, the regulated game may further include a second reward table associated with the second reward generating assets, the second reward table including a second reward multiplier probability distribution and a corresponding range of second reward multipliers, the second reward generating assets being configured such that, upon successful player interaction therewith, the second random number may be used as a second index into the second reward multiplier probability distribution to obtain a corresponding second reward multiplier within the range of second reward multipliers and the second reward due may be a product of the second reward multiplier and a second collision wager that may be dependent upon the time elapsed since the last successful interaction with any of the second reward generating assets.

Another embodiment of the present invention is a regulated gaming method that includes steps of providing a source of random numbers; providing a first level of a regulated game, the first level including a plurality of first reward generating assets; setting a first average RTP percentage for the provided first level; generating a first reward upon a successful player interaction with any one of the first reward generating assets generating a first reward, the first reward being dependent upon the first average RTP percentage, a first random number obtained from the source of random numbers and a time elapsed since a last successful interaction with any one of the first reward generating assets; providing a second level of the regulated game, the second game level including a plurality of second reward generating assets; setting a second average RTP percentage for the provided second level, the second average RTP being comparatively higher than the first average RTP percentage, and generating a second reward upon a successful player interaction with any one of the second reward generating assets, the second reward being dependent upon the second average RTP percentage, a second random number obtained from the source of random numbers and a time elapsed since a last successful interaction with any one of the second reward generating assets.

The method may further include steps of determining a level of skill of a player in the first level of the regulated game, and enabling the player to play the second level of the regulated game only when the determined level of skill reaches a predetermined threshold. The method may further include steps of providing successively higher numbered levels of the regulated game, each having with progressively higher average RTP percentages, and each accessible to the player upon being determined to have reached progressively higher levels of skill.

The method may include a step of configuring the regulated game and/or the levels as a first person shooter and/or as a scripted narrative (for example).

The method may further include configuring the first reward generating assets of the first level to return, on average, lower rewards upon successful player interaction therewith than are returned upon successful player interaction with the second reward generating assets of the second game level.

The method may also include providing a first reward table associated with the first reward generating assets, the first reward table including a first reward multiplier probability distribution and a corresponding range of first reward multipliers and, upon a successful player interaction with any one of the first reward generating assets: using the first random number as a first index into the first reward multiplier probability distribution to obtain a corresponding first reward multiplier within the range of first reward multipliers, and calculating the first reward due as a product of the first reward multiplier and a first collision wager that is dependent upon the time elapsed since the last successful interaction with any of the first reward generating assets.

Similarly, the method may also include steps of providing a second reward table associated with the second reward generating assets, the second reward table including a second reward multiplier probability distribution and a corresponding range of second reward multipliers and, upon a successful player interaction with any one of the second reward generating assets: using the second random number as a second index into the second reward multiplier probability distribution to obtain a corresponding second reward multiplier within the range of second reward multipliers, and calculating the second reward due as a product of the second reward multiplier and a second collision wager that is dependent upon the time elapsed since the last successful interaction with any of the second reward generating assets.

DETAILED DESCRIPTION

In the following detailed description of exemplary embodiments of the invention, reference is made to the accompanying drawings, which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Figure 1:
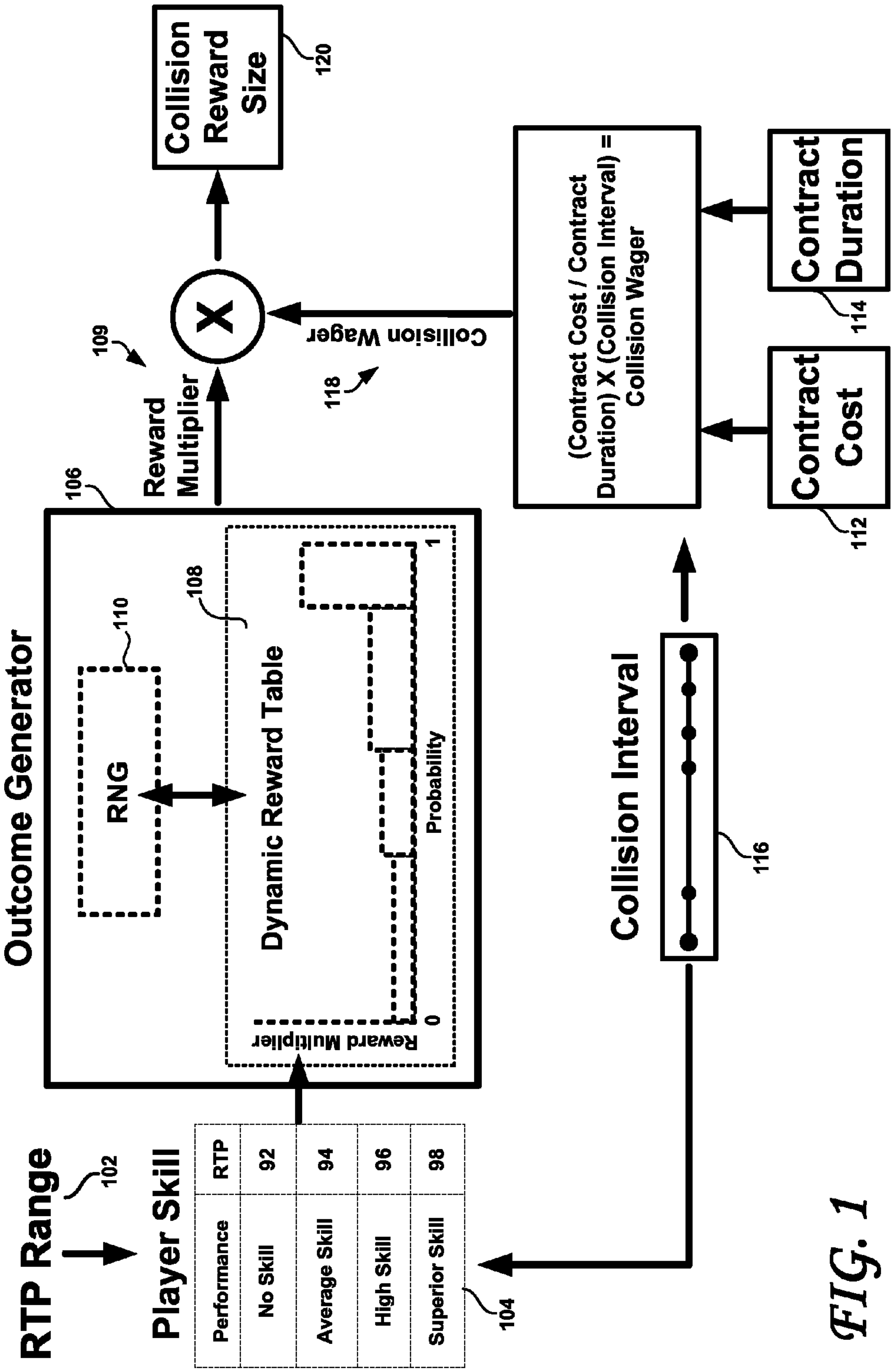
FIG. 1 depicts a high level flow of the wagering process within a regulated gaming environment featuring the Return Driven Outcome Generator, according to an embodiment of the present invention.

FIG. 1 depicts a high level flow of the wagering process within a game featuring the Return Driven Outcome Generator (RDOG), according to an embodiment of the present invention. Games configured with RDOG may be configured with a fixed RTP range 102 that comes preinstalled on a gaming machine or may be configured to use an operator configurable average RTP percentage range. Operator configured games self-adjust to return an operator-input percentage of funds to the player and hold the rest for the house.

RDOG configured games, according to embodiments of the present invention, may feature skill-based grading 104, such that players are graded on how they perform various tasks within the game, with the game using those player grades to determine where its actual average RTP percentage will fall within its preset average RTP percentage range 102. For example, in a game with a preset average RTP percentage range of 98-92%, a player exhibiting no or minimal skill may cause the game to payout at the game's minimum 92% average RTP percentage, while a player exhibiting superior skill may cause the game to payout at the game's maximum payout percentage of 98%. It is important to note that, while lower-skilled players are assigned a lower average RTP percentage in this model, they still have an opportunity to win in a particular gaming session because of the game's inherent randomness.

According to embodiments of the present invention, once a RDOG game is assigned a preset average RTP percentage range and has determined which player skill grade is applicable (some games, according to further embodiments, may not use skill based grading while others, according to further embodiments, may default to an average player skill grade until the player has played long enough to earn his or her individual skill grade), this data is input into the Outcome Generator 106. The Outcome Generator 106 performs at least two functions: the generation of Dynamic Reward Tables 108 and random number generation through a Random Number Generator (RNG) 110. Dynamic Reward Tables 108 assign specific wagering properties to game reward generating assets appearing within a RDOG game. Note that not all game assets within a RDOG game may be configured as being reward generating. Whenever the player encounters, collides or otherwise interacts with those assets (i.e., when the player's Pac-man eats a bonus cherry (an example of a reward generating asset) or the player's pinball hits a bumper (another example of a reward generating asset)), a reward table for the award generating asset with which the player has collided may be referenced by a random number output from a Random Number Generator (RNG) and a corresponding reward multiplier 109 is output. That is, the RNG 110 generates a random number between 0 and 1 and that randomly generated number is used as a reference or index into the dynamic reward table for that reward generating asset and the corresponding reward multiplier 109 is read from the table. Note that the dynamic reward table 108 may be configured to assign a predetermined reward multiplier 109 for specific ranges between 0 and 1. As shown in FIG. 1, the widest range may be associated with the lowest reward multiplier, with progressively narrower ranges being associated with progressively higher reward multipliers. However, the dynamic reward tables 108 may be configured with as little or as much variability (e.g., the difference between the lowest reward multiplier and the highest reward multiplier) as desired. According to an embodiment of the present invention, the reward multiplier 109 output from the outcome generator 106 may be used in conjunction at least with the wager size to determine the size of the player's financial reward for each collision or interaction (or successful collision or interaction) with a reward generating asset within a regulated gaming environment featuring RDOG functionality.

Several key factors may determine the size of the player's wager and, by extension, his reward when he collides with a reward-generating asset within an RDOG game. According to embodiments of the present invention, players may initiate a game by purchasing a time-based contract. Each second of that contract has a value that may be expressed by dividing the contract cost 112 by the contract duration 114. For example, a 60 second contract that costs $6.00 has a contract value of 10 cents per second. According to embodiments of the present invention, once the value of time within the contract has been internally calculated, the size of a collision wager may be calculated by multiplying the value of time within the contract by how much time has elapsed since the last collision (a concept referred to hereafter as the "Collision Interval" 116). Therefore, the formula for determining a collision wager in a RDOG game may be expressed, according to one embodiment of the present invention, as (Contract Cost/Contract Duration)×(Collision Interval)=Collision Wager 118. The Collision Reward Size 120 may then be determined by multiplying the collision wager 118 by the reward multiplier 109 output by the Outcome Generator 106.

Figure 2:
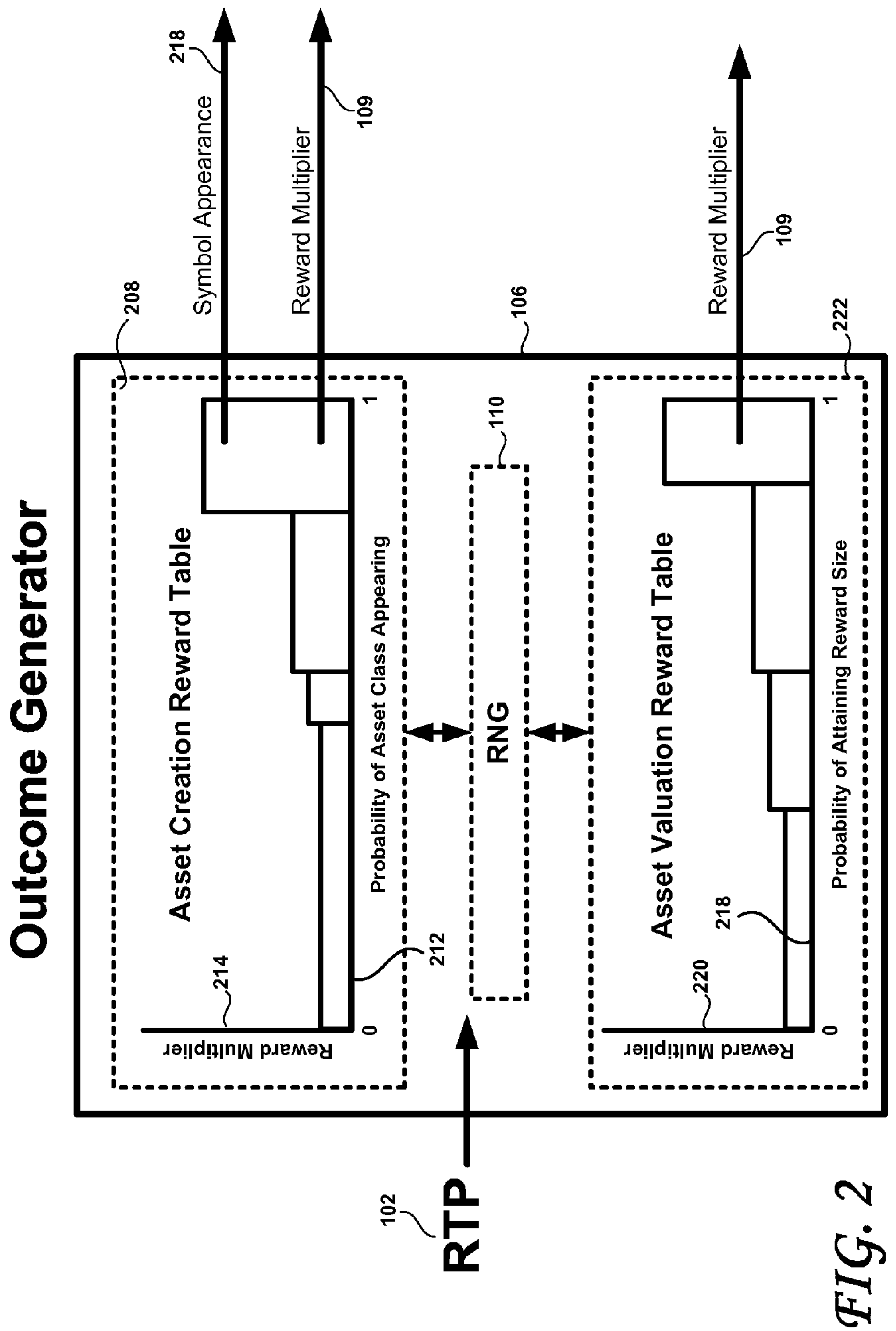
FIG. 2 shows further aspects of the Return Driven Outcome Generator, according to an embodiment of the present invention.

FIG. 2 provides additional details of an embodiment of the Return Driven Outcome Generator. As was detailed relative to FIG. 1, average RTP percentage 102 is the key input into the RDOG. The average RTP percentage 102 that is input into the Outcome Generator 106 may or may not be altered as a result of skill-based grading within (and during) the game.

As is the case with all electronic games of chance, RDOG games derive their randomness from a random number generator 110. It should be noted that while RDOG games according to embodiments of the present invention offer the player a radically different gaming experience than that of traditional slot machines, they require no changes or customizations to the standard slot machine RNG.

The most significant function of the Outcome Generator 110 is the generation of Dynamic Reward Tables such as shown at 108 in FIG. 1 and at 208 and 210 in FIG. 2. These tables represent the foundation of RDOG casino video games, and may determine the probabilities at work for all significant in-game wagering events.

To understand the full functionality of the Outcome Generator, it is necessary to understand the two key classes of casino video games that it helps to create. The RDOG wagering system facilitates the creation of: 1) casino video games in which the full playing landscape is visible to the player at all times (referred to here as "single-screen" games) and 2) casino video games in which the playing landscape is revealed to the player on a gradual, screen-by-screen basis (referred to here as "multi-screen" games). The properties of reward-triggering game assets used in both the single-screen and multi-screen models are created by the Outcome Generator 106.

In multi-screen games, according to embodiments of the present invention, future obstacles and reward triggers (assets within the gaming environment, a collision with which triggers an award) in the game may be generated randomly as the player encounters them. For example, in a car racing game in which the player can only see a small section of road in front of him, reward-triggering bonus flags (examples of reward generating assets) of different colors and reward levels may randomly appear in the driver's path as he races towards the finish line. This is the first key role of the Outcome Generator 106, as it must assign the asset class and wagering properties/probabilities of future symbols as the player encounters them. This symbol assignment process may be accomplished, according to embodiments of the present invention, through calling an Asset Creation Reward Table 208 (a type of Dynamic Reward Table) that associates the probability that each symbol within the game's universe will appear before the player, shown on the X axis 212 with the reward multiplier associated with each different class of symbol, shown on the Y axis 212. Based on this random call to these Asset Creation Reward Tables 208, the game is able to randomly determine the appearance of a future symbol appearing within the game 216 and to determine the symbol's reward multiplier 109 (the quantity with which the collision wager 118 will be multiplied when the player collides with the newly generated reward generating asset to determine the collision reward size 120).

According to embodiments of the present invention, multi-screen games like the driving game described earlier may grade the player on skill as play unfolds—by measuring, for example, how long it takes a driver to reach certain predetermined milestones—and then use the stored grades to affect how the game generates future scenarios. For instance, if within a car racing game there are reward generating assets embodied as yellow bonus flags that return small rewards, blue bonus flags that return average sized reward, and green bonus flags that return large rewards, a particularly skilled player will encounter more green flags in his path based on his previously demonstrated skill level. This increased frequency of appearance of comparatively higher-valued reward generating assets occurs because the player's skill increases the game's average RTP percentage, which in turn may correspondingly increase the probability that higher-valued reward generating assets will appear as the game unfolds; that is, in the game's future. It should be noted that such skill-based changes to a game's future outcome generation do not compromise the randomness of the game; they affect only the probabilities of various future game scenarios occurring. Therefore, no new regulatory issues are raised by such skill-based games according to embodiments of the present invention.

The role of the Outcome Generator 106 in single-screen games according to embodiments of the present invention is different. In single screen games, the appearance/class of most game assets are known to the player at all times since the full gaming screen is always visible. In these scenarios, the player's reward multiplier when colliding with a given class of reward generating asset may not be fixed like in the multi-screen model, but rather may be determined randomly at the moment of collision. This reward multiplier generation is accomplished by referencing a different type of Dynamic Reward Table that is specific to the reward generating asset with whom the player has collided, shown in FIG. 2 as an Asset Valuation Reward Table 222. In the Asset Valuation Reward Table 222, all possible reward multiplier sizes are shown on the Y axis 220 and the probabilities of achieving each reward size are shown on the X axis 218. The game's RNG 110 uses this table 222 to determine a reward multiplier 109, which is the key output of Asset Valuation Reward Tables within the Outcome Generator 106. For example, if the random number output from the RNG 206 is 0.8, the reward multiplier output 224 will be higher than if the random number output from the RNG 206 is 0.2.

Figure 3:
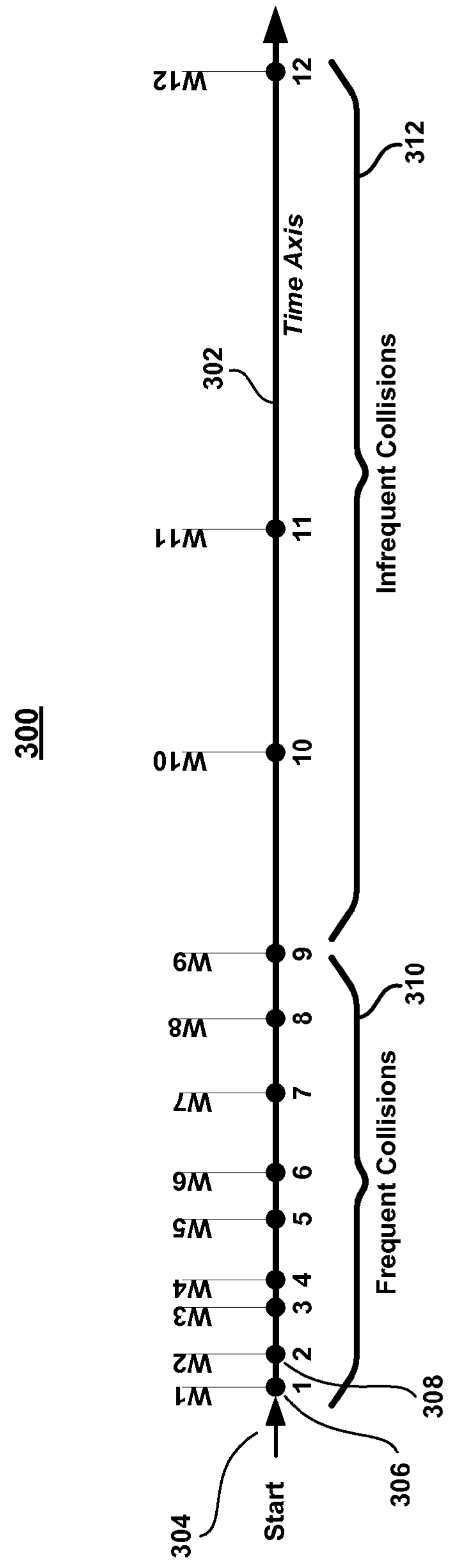
FIG. 3 demonstrates how collision intervals impact wagering within a regulated gaming environment using the Return Driven Outcome Generator, according to an embodiment of the present invention.

FIG. 3 demonstrates how collision intervals impact wagering within a game using a Return Driven Outcome Generator, according to embodiments of the present invention. As noted above, the player may initiate an RDOG game by purchasing a time-based contract. The duration of this contract in FIG. 3 is represented by the horizontal Time Axis. As the player engages in RDOG game play, collisions occur. That is, the player collides with, touches, bounces off, passes a game milestone, kills an opponent, passes a threshold or otherwise successfully interacts with a reward generating asset within the game. Each or selected ones of such collision or interaction may initiate a "wager" within the game, where the player has the opportunity to win funds. These "wagers" are non-traditional in the sense that the player does not press a "bet" button to initiate them. However, such "wagers" share the spirit of traditional betting in the sense that they represent opportunities for the player to win funds. According to embodiments of RDOG games, wagers resulting from in-game collisions may only result in neutral or positive financial outcomes, meaning that the player's current balance cannot be lowered based on the outcome of a collision wager. However, other embodiments of the present invention may include RDOG games in which certain assets within the game are configured as penalty inducing assets, in which the player's current balance may be negatively impacted through interaction with such assets. Still further embodiments of the present invention may include reward generating assets and penalty inducing assets, and/or game assets that (e.g., randomly) change from reward generating to penalty inducing. In the description to follow, however, the assets are reward generating assets, it being understood that embodiments of the present invention may also be configured with penalty inducting game assets.

On the timeline depicted in FIG. 3, collision wagers are represented by large dots on the Time Axis 302. In this case, the first wager 306 is marked by the notation W1 and the second wager 308 is marked by the notation W2. After starting the game at 304, the pace with which the player collides with reward generating assets in the game affects his gaming experience. When the player collides frequently (e.g., W1, W2, W3, W4, W5, W6, W7, W8 and W9) with reward generating assets as shown at 310, his wager sizes will be smaller. In contrast, when the player collides more infrequently (e.g., W10, W11 and W12) with reward generating assets as shown at 312, his wager sizes will be comparatively larger. This dynamic, disclosed in commonly assigned U.S. Pat. No. 6,645,075, ensures that the game's average RTP percentage remains fixed regardless of the pace at which he plays, as frequent collisions are associated with smaller wagers, whereas more infrequent collisions are associated with comparatively larger wagers.

Figure 4:
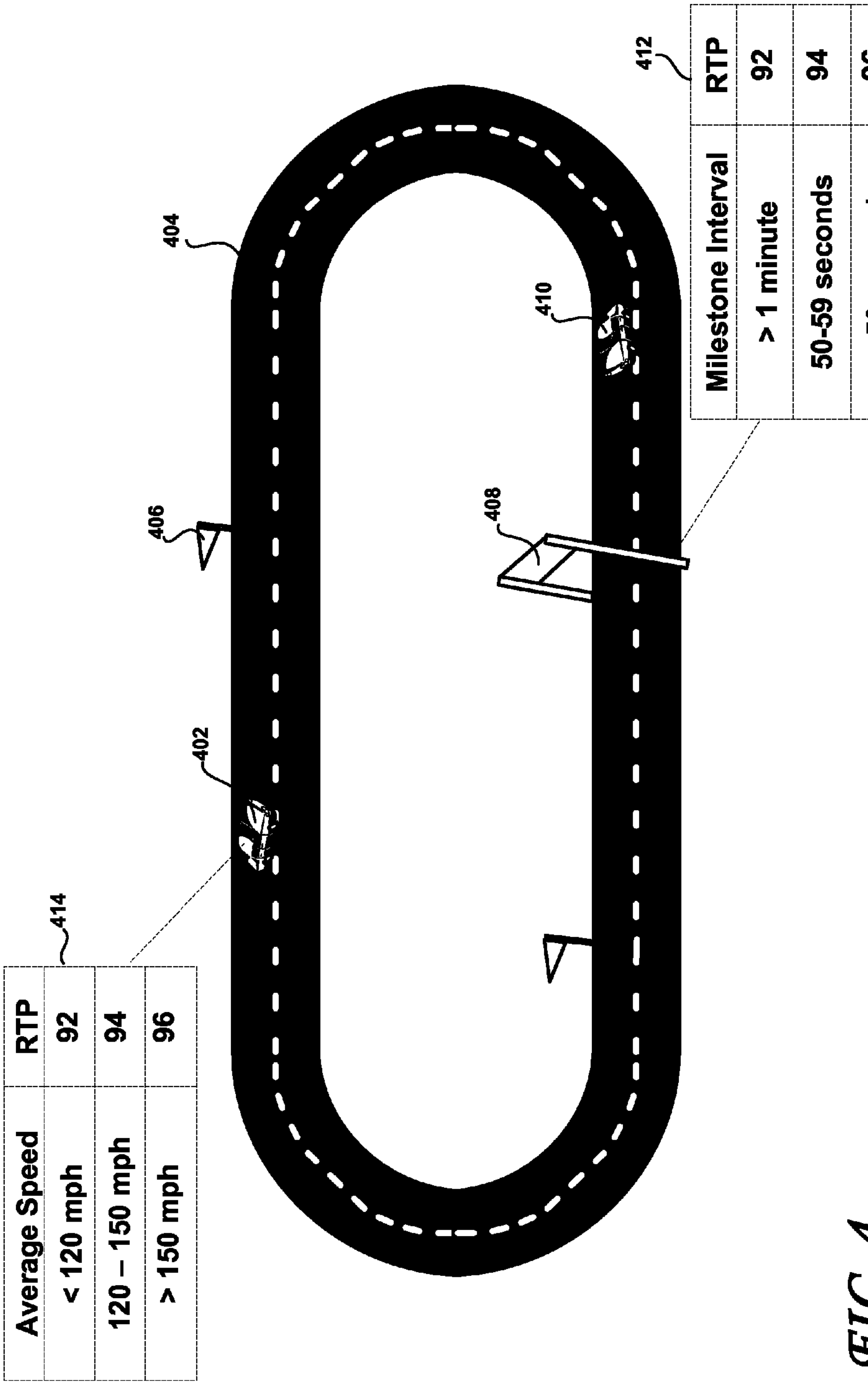
FIG. 4 demonstrates how regulated gaming environments featuring the Return Driven Outcome Generator according to an embodiment of the present invention may adjust their RTP based on player skill.

FIG. 4 demonstrates how games featuring a Return Driven Outcome Generator 106 may adjust their average RTP percentage based on player skill, according to embodiments of the present invention. FIG. 4 details skill-based grading in the context of an auto racing themed electronic game of chance, FIG. 6 details skill based grading and RDOG as applied to a maze-style arcade game, FIG. 7 details skill-based grading and RDOG as applied to "shoot'm up" style games, and FIG. 8 details skill-based grading and RDOG as applied to pinball games. In fact, skill-based grading may be applied to almost any preexisting video game including but not limited to sports games like EA Sports' "Madden Football®", 2D horizontal scrolling games like Nintendo's "Super Mario Bros®," and 3D first person shooters like Bungie Studio's "Halo®" series of games.

FIG. 4 depicts a very simple racing game in which a car 402 races around a track 404 in an attempt to reach milestones. According to embodiments of the present invention, wagers may be placed in such a game whenever the car passes or collides with a reward generating asset embodied, in this game, as bonus flag 406. Likewise, the game may also include a reward generating assets such as milestones, such as a milestone marker 408. Another form of a reward generating asset may include an opponent, such as competing car 410. In this case, a wager may be placed when the player (embodied as car 402) interacts with (e.g., passes or physically collides with, in the case of a demolition derby game) a reward generating asset (embodied as competing car 410 controlled by the game or another player) or, for example, when the car 402 passes other cars with which it is competing. If implemented in the game design and optionally enabled by operator or by player selection, wagers may also be initiated when the car 401 gets off track or crashes with an obstacle. In that case, there may be no penalty induced but just additional opportunities to wager and grade unskilled players. That is, running off the track or colliding with another car on the course (to use two representative examples) may not result in a wager that decreases the player's funds, but may result in a lower skill grade that may, in turn, negatively affect the player's average RTP percentage (and/or his or her opponent's average RTP percentage). The game may grade player skill internally by capturing the amount of time it takes the car to reach certain milestones (i.e. the "milestone interval") 408, by capturing the player's average speed, or through the use of any metric the game designer feels accurately measures the player's skill. That is, different time ranges may be associated with different average RTP percentages, as shown in the table 412 in FIG. 4. For example, a relatively unskilled player that takes more than a minute to reach a milestone within a game (such as milestone 408) may be awarded a low average RTP percentage of, for example, 92. A player exhibiting relatively greater skills that takes between 50 and 59 seconds to reach the same milestone may be awarded a comparatively larger average RTP percentage (such as, for example 94), and a very skilled player that takes less than 50 seconds to reach the same milestone may be assigned the highest average RTP percentage of, for example, 96. The average RTP percentage vs. graded skill distribution may be as coarse or fine-grained as desired. Likewise, the player's measured speed around the track and/or points collected may determine the player's assigned average RTP percentage, as shown in the table 414 in FIG. 3. The average RTP percentage thus assigned to the player may then be filtered down into the dynamic reward tables of all game assets, such that skilled players may earn comparatively higher returns within the game, on average, than players having a comparatively lower skill level. This system provides motivation for players to learn to play a game well, since better player earn better average RTP percentages, but does not discourage less skilled players since the random element within the game gives even the least skilled player the opportunity to win funds through good fortune. According to some embodiments of RDOG games, the player's skill grade may be re-calculated at predetermined intervals or milestones during game play such that the average RTP percentage assigned to the player is dynamic in nature and changes during game play.

The following illustrates how RDOG games may dynamically self-adjust to reward skilled players. For example, player A may purchase a 1 minute contract to play an auto racing game for $6. In this example, player A is an unskilled player and is, therefore, assigned an average RTP percentage of 92, which is the lowest possible average RTP percentage within the game's preset average RTP percentage range. If player A's first collision with a reward generating asset within the game occurs 30 seconds into game play, his collision wager may be calculated as follows: ($6/60 seconds)×(30 seconds)=a $3 wager. Given that the player's average RTP percentage=92, the casino can expect to keep, on average, 24 cents for wagers such as this one ($3 wager×8% casino hold=24 cents lost), although the actual result of the single wager in question will be governed by the game's RNG and the specific dynamic reward paytable associated with the reward generating asset with which the player has collided.

Continuing with this example and within the same game, player B purchases a 3 minute contract to play for $18. Player B is known to be or is determined to be a highly skilled player and is, therefore, assigned an average RTP percentage of 98, the highest possible average RTP percentage with the game preset average RTP percentage range. If player B's first collision within the game occurs 10 seconds into game play, his collision wager may be calculated as follows: ($18/180 seconds)×(10 seconds)=a $1 wager. Given that this player's average RTP percentage=98, the casino can expects to hold only 2 cents of Player B's wager long term, which represents a reward for his skilled play. Notice, then, that such a system provides both a reward to the player for good performance and a guaranteed positive return for the casino.

The auto racing track featured in FIG. 4 is depicted in its entirety for purposes of illustration. It should be noted that auto racing games in which the driver may only see a small segment of the track in front of him at any given time (i.e. multi-screen games) are more common and are sufficiently accounted for within the present RDOG model. Methods of future asset generation in multi-screen games are detailed further relative to FIG. 5.

Figure 5:
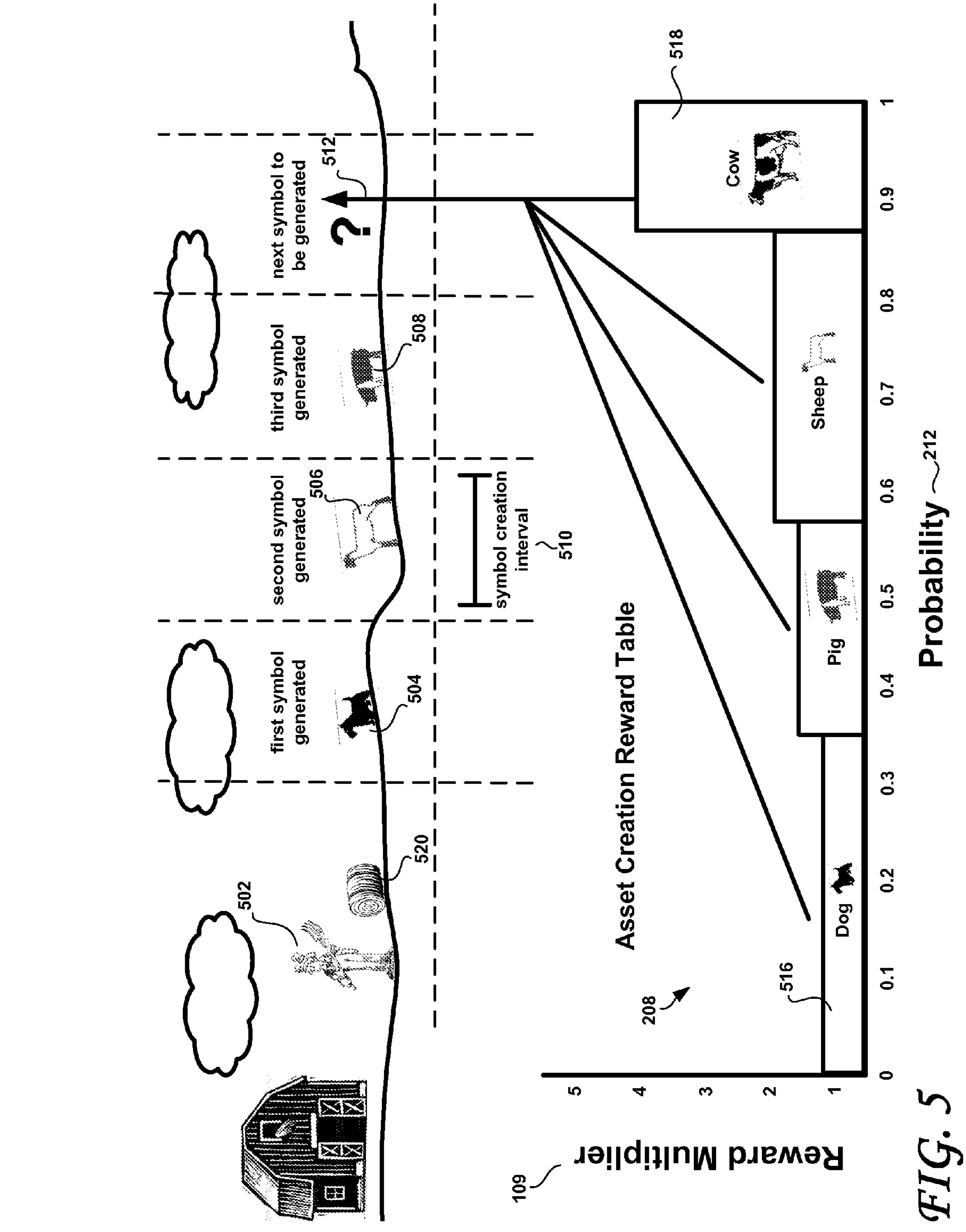
FIG. 5 demonstrates how the Return Driven Outcome Generator according to an embodiment of the present invention generates future reward generating assets and values thereof in a 2D horizontal scrolling video game.

FIG. 5 demonstrates how a Return Driven Outcome Generator according to an embodiment of the present invention may generate future reward generating assets and game asset values in a 2D horizontal scrolling video game. Ever since the advent of early Atari video game classics like Activision's Pitfall, 2D horizontal scrolling video games have held a segment of the video game market. Such games are good candidates for RDOG play because of their multi-screen nature, which gives them the ability to generate future reward generating assets as those assets enter the player's field of vision. FIG. 5 shows a simplified version of a farm-themed 2D horizontal scrolling game in which an animated farmer 502 travels across a landscape encountering farm animals (reward generating assets) that have escaped from his barn such as dogs 504, sheep 506, pigs 508, and cows that he may "capture." In the game's premise, any time the farmer captures an animal he is given a reward.

As the farmer 502 travels along the game's landscape, the game dynamically generates the animals he will encounter at symbol creation intervals 510 that may be either random or predetermined. The determination of a new symbol's identity 512 occurs at random, based on a dynamic reward table 514 created by a Return Driven Outcome Generator such as shown at 106 in FIGS. 1 and 2. In the depicted example, any of four animals may be created, with dogs being the most likely animal to be created (35% of the time a dog will be created) as shown at 516 and with cows being the least likely animal to be created and carrying the largest reward multiplier (4.1×) 518 to the player when captured by the farmer. Notice that the X axis on the Asset Creation Reward Table shows the probability 212 of each animal being created and the Y axis 214 contains the reward multiplier 109 associated with the capturing of each animal.

In this example, the size of a player's reward when encountering an animal in this game may be captured in the following formula: (Contract Amount/Contract Duration)×Collision Interval×Reward Multiplier. For example, a player having purchased a 1 minute contract for $6 who collides with a dog in after 10 seconds of collision-free game play would earn: ($6/60 seconds)×10 seconds×1.1 reward multiplier=$1.10 reward.

The game may be configured such that, should the player deliberately avoid capturing an animal in this scenario—by, for example, jumping over it—the player would surrender his collision reward and a new collision interval would begin. This scenario is equivalent to a video poker player deliberately discarding a reward generating hand like a straight flush that has been dealt to him pat. In the manner that some video poker machines force players to hold reward-generating hands (like a royal flush), embodiments of RDOG game may be configured to force players to accept wagering opportunities presented to them.

2D horizontal scrolling games such as the farm game of FIG. 5 may also include elements of skill-based grading such that players with a high degree of skill achieve larger rewards when encountering reward generating assets within the game. For example, the game may feature obstacles such as hay bales 520 that must be jumped over or cleared with a pitchfork, creeks that must be crossed, or hostile animals (such as a coyote, for example) with whom the farmer must engage in battle, etc. Such obstacles may be generated at random or they may appear at fixed intervals. Within the premise of the described game, players who negotiate such obstacles with a greater success rate may receive larger rewards when encountering reward generating assets such as dogs, pigs, sheep, and cows, as the player's skill grade will increase the player's average RTP percentage and cause the game to generate more generous reward tables in the skilled player's future.

It should be noted that while the foregoing demonstrates how RDOG-enabled games according to the present invention may create reward generating assets not yet encountered by the player in a 2D horizontal scrolling game, the same concept can easily be applied to a 3D maze style game like Doom® or Halo® in which players enter new rooms or segments of a maze and encounter reward generating that had previously been outside of their field of vision.

Figure 6:
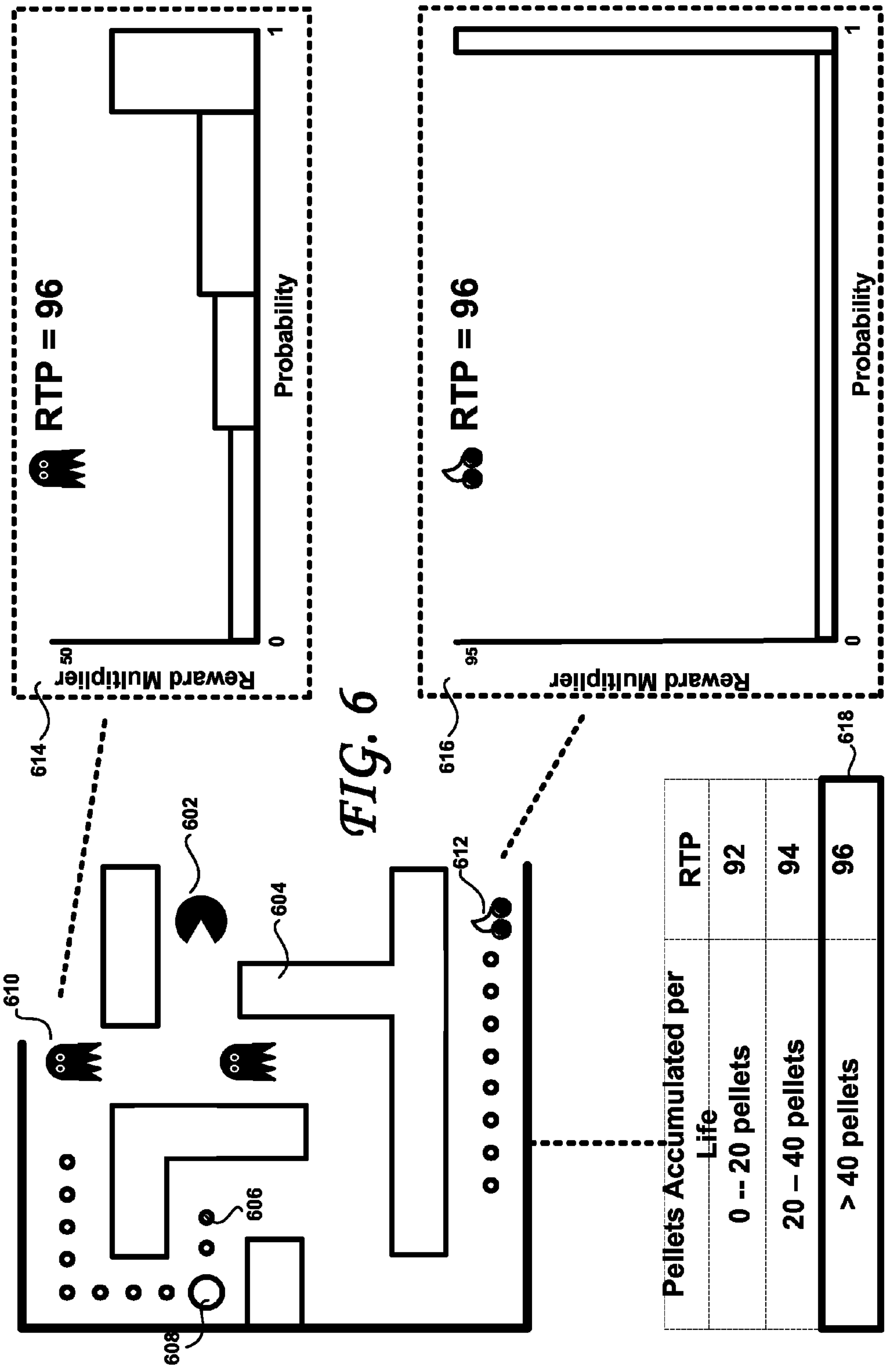
FIG. 6 demonstrates how the Return Driven Outcome Generator according to an embodiment of the present invention assigns values for reward generating assets in a single screen maze-style game, in this case Namco's Pac-man®.

FIG. 6 demonstrates the manner in which embodiments of the present invention may assign values for reward generating assets in a single screen maze-style game, in this case Namco's Pac-Man®. In the RDOG version this arcade classic, the player maneuvers his Pac-Man character 602 through an onscreen maze 604 looking to eat pellets 606 and power pellets 608 while avoiding non-blue ghosts 610. As in the arcade style version of the game, whenever the player eats a power pellet 608, the ghosts turn blue and the Pac-Man has a brief window of time to eat them and be rewarded. In the RDOG version of the game, each time the player collides with a reward generating asset—in this case, a cherry 612 or a power pellet 608, or a blue ghost, the player has the opportunity to win funds by entering into a wager that may be determined by, for example, a combination of the player's assigned average RTP percentage, the reward multiplier as determined by an Asset Valuation Reward Table and the amount of time that has elapsed since the player's last collision (e.g., the time interval since the player last ate a cherry, power pellet or ghost), computed as detailed above.

As is indicated in FIG. 6, each reward generating asset may have an Asset Valuation Reward Table (such as shown and described relative to reference numeral 222 in FIG. 2) associated therewith. In this example, blue ghosts are associated with an Asset Valuation Reward Table 614 that is separate from the Asset Valuation Reward Table for cherries 616. While both blue ghosts and cherries are associated with the same average RTP percentage (96 in this case), it should be noted that they have different volatility levels. The blue ghost Asset Valuation Reward Table 614 returns medium sized reward multipliers most of the time, while the cherry Asset Valuation Reward Table 616 returns a very small reward multiplier most of the time and a very large reward multiplier once in a great while. The RDOG model according to embodiments of the present invention allows game designers to add excitement to games by programming in both non-volatile "small reward" reward generating assets like the blue ghost and very volatile "home run" style reward generating assets such as the cherry in the example developed herein. This flexibility allows players to accumulate many small wins throughout game play to keep them invested while also giving them opportunities to win larger rewards periodically. If implemented in the game design and optionally enabled by operator or by player selection, wagers may also be initiated when the non-blue ghost eats Pac-Man®. In that case, there may be no penalty induced but just additional opportunities to wager and grade unskilled players (and optionally change their currently assigned average RTP percentage).

Maze-style games like Pac-Man® may also employ skill-based grading. This concept is demonstrated in table 618, which makes a version of casino Pac-Man® possible in which players who average a greater number of pellets eaten per collision with a non-blue ghost within the game earn a higher average RTP percentage than lesser skilled players.

Figure 7:
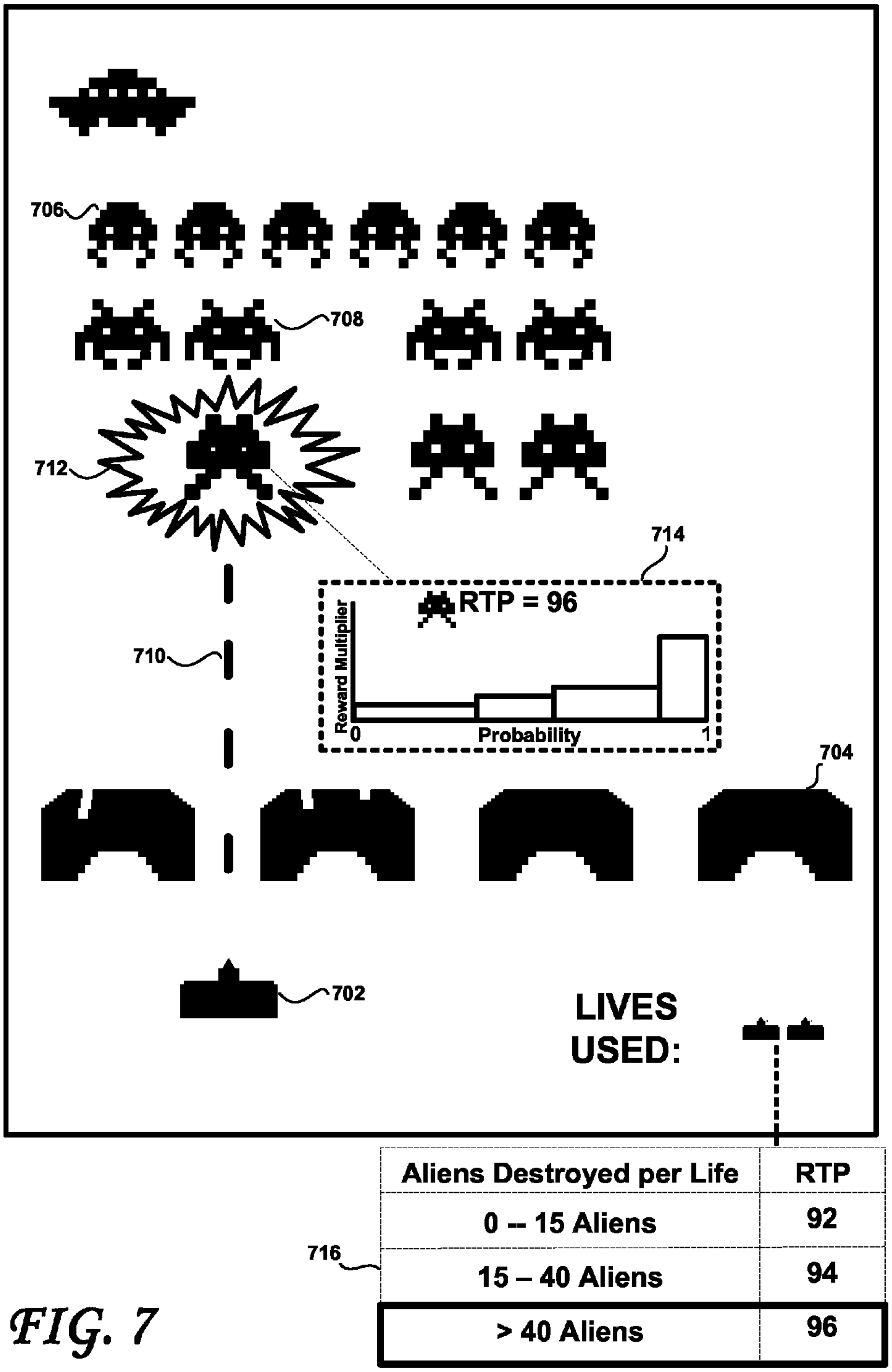
FIG. 7 demonstrates how the Return Driven Outcome Generator according to an embodiment of the present invention assigns values for reward generating assets in a single screen "shoot'm up" style game, in this case Midway's Space Invaders®.

FIG. 7 demonstrates how the present Return Driven Outcome Generators may assign reward generating asset values in a single screen "shoot'm up" style game, in this case Midway's Space Invaders®. In the RDOG version of this arcade classic, players maneuver their cannon 702 on a horizontal plane using shields 704 to protect themselves from bombs dropped by various forms of aliens 706, 708. Players also use the cannon to shoot 710 at the aliens in an attempt to destroy them. Whenever the player's gunfire successfully hits an alien 712 or other reward generating asset, a specialized reward table 716 for the destroyed reward generating asset is referenced by the game's RNG and the player has the opportunity to receive a financial reward using the reward multiplier obtained by applying the output of the RNG to the reward table 716. The player's skill level in this "shoot'm-up" style game (in this case, his or her ability to destroy aliens) affects the average RTP percentage, with lesser skilled players being assigned a smaller average RTP percentage than comparatively more skilled players. It should be noted that first person "shoot'm-up" games such as Microsoft's Halo®, for example, may be readily adapted to feature RDOG functionalities.

It should also be noted that single-screen arcade games like Space Invaders® or Pac-Man® often progress to new and more difficult screens/levels when an existing screen is "conquered" or completed. For example, in Pac-Man® when all of the pellets within a maze are eaten, a new and more difficult maze appears on screen in which the ghosts move faster, the power pellets result in a shorter window to eat the ghosts, etc. In Space Invaders®, when a player destroys all of the aliens on the gaming screen, a new fleet of aliens appears that advances downward toward the player's cannon at a greater rate of speed. Casino RDOG adaptations of these games (or games specifically designed for RDOG casino video game play) may also feature levels of escalating difficulty. In such scenarios, game play may continue without any changes, or the player may be rewarded for reaching a higher game difficulty level by encountering more generous asset reward tables, a greater frequency of reward generating assets, more lenient skill-based grading, or by any other measure game designers wish to implement that does not compromise the game's predetermined average RTP percentage or average RTP percentage range or affect the RNG.

Figure 8:
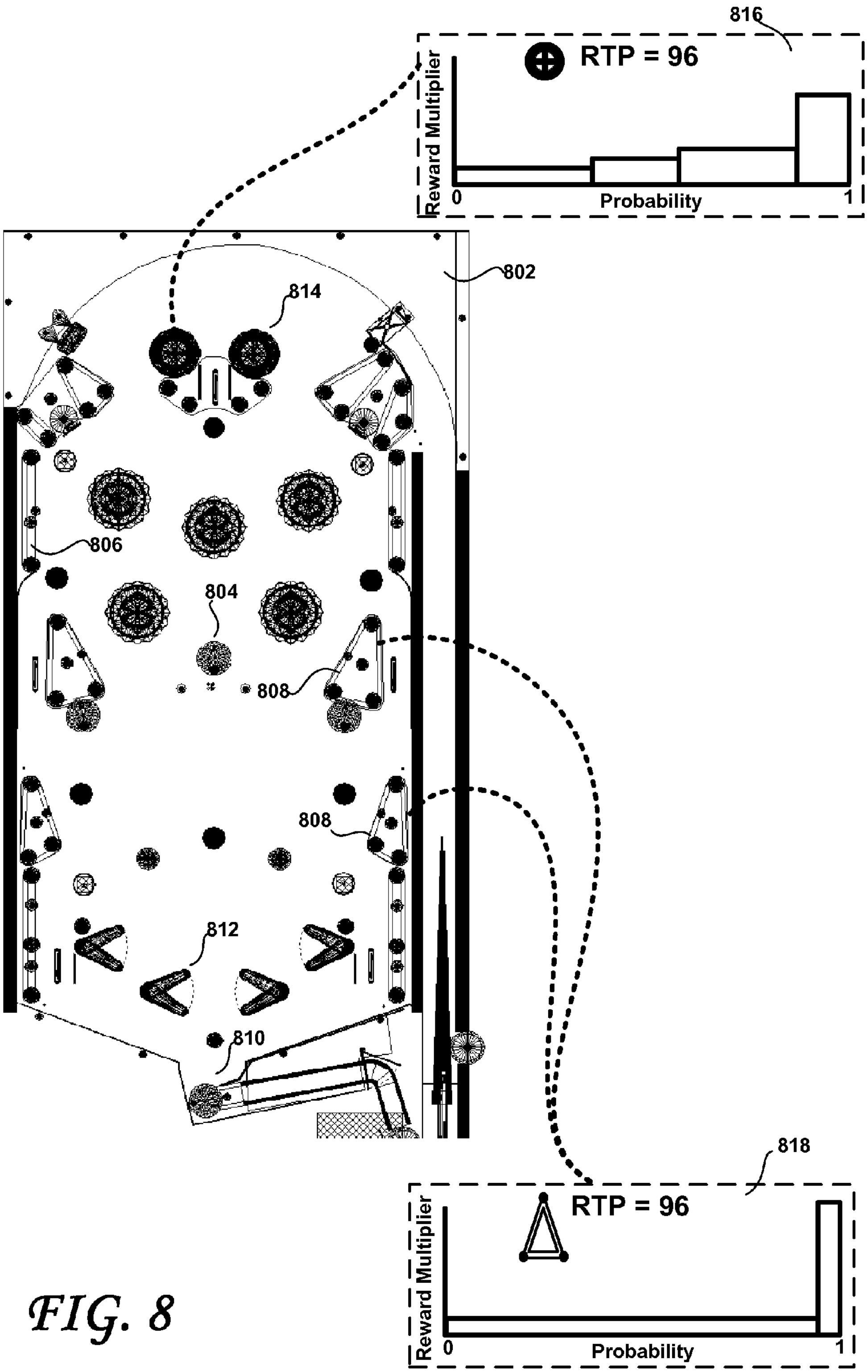
FIG. 8 demonstrates how the Return Driven Outcome Generator according to an embodiment of the present invention assigns values for reward generating assets in a pinball game.

FIG. 8 demonstrates an electronic or video pinball game adapted to include the functionalities of embodiments of the present invention. In the RDOG version of this arcade classic, players launch a virtual ball into a virtual pinball playfield 802 and attempt to win funds by causing the ball to collide against various in-field reward generating assets such as circular bumpers 804, rails 806, and triangular rails 808. When the player's ball falls into the gutter 810 at the bottom of the playfield, a playing session is over and he must launch a new ball into the playfield. The player may use a series of flippers 812 to propel the ball upward toward the reward generating assets and away from the gutter.

According to an embodiment of the present invention, whenever the player's ball collides with reward generating assets (bumpers, rails, flippers, etc), the game references a specific reward table associated with the reward generating asset with which the ball has collided and provides the player the opportunity to receive a financial reward using the reward multiplier derived from the application of the output of the RNG to the specific reward table associated with the reward generating asset with which the ball has collided. For example, when the player's ball collides with the circular bumper 814, a reward table specific to that reward generating asset 816 referenced and the game's RNG determines the player's reward. Different reward generating assets within the game may be associated with different reward tables. Alternatively, several reward generating assets or several kinds of reward generating assets may be assigned a same reward table. The reward tables themselves may be configured as desired. For example, the triangular rail 808 is depicted in FIG. 8 to be associated with a considerably more volatile reward table 818 than that of the circular bumper 814, in that most collisions with the triangular bumper 808 will result in a small reward multiplier and a very few such collisions will result in a very large reward multiplier.

Figure 9:
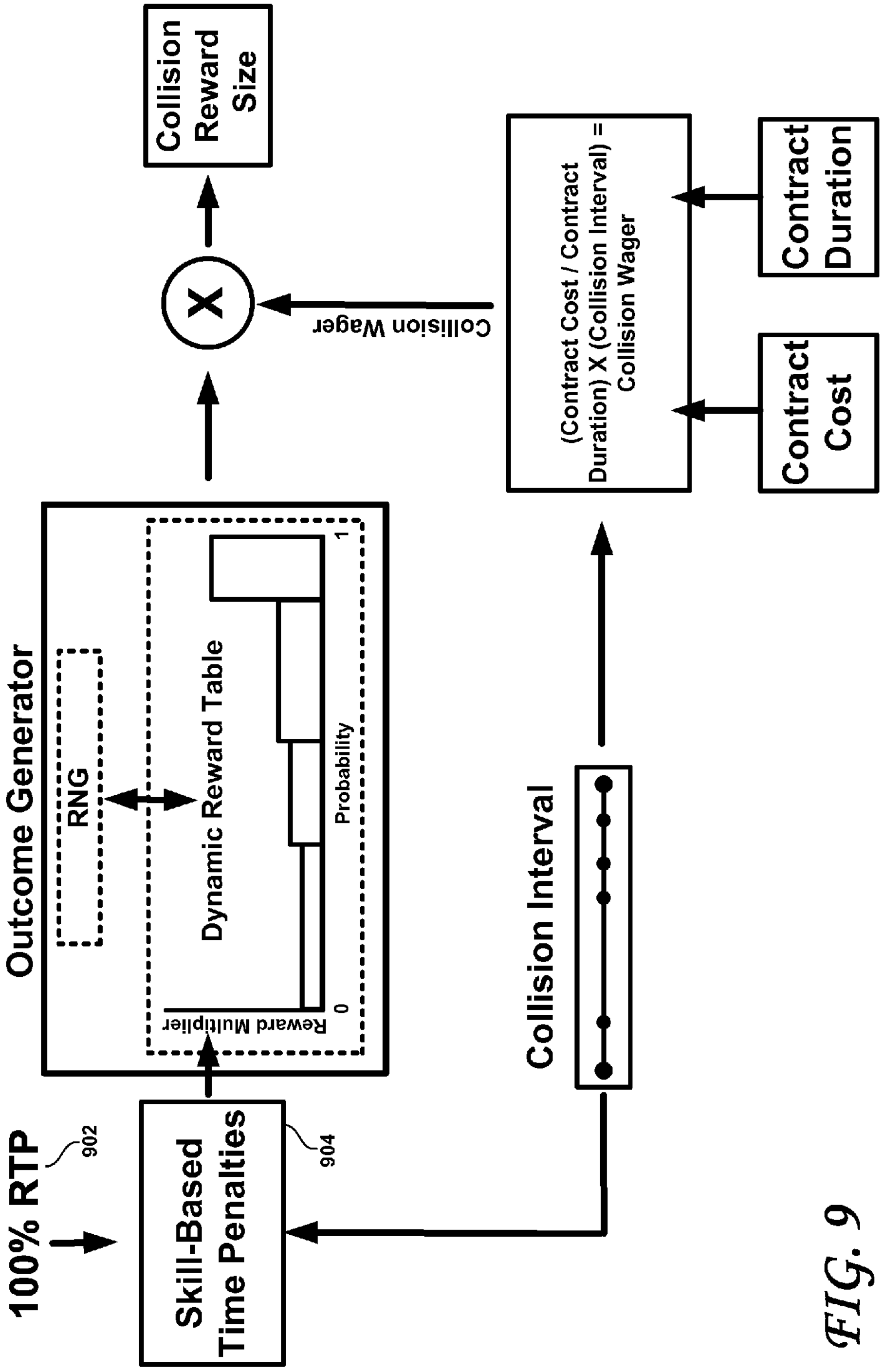
FIG. 9 depicts another embodiment of skill based scoring within the Return Driven Outcome Generator wagering model of the present inventions.

FIG. 9 depicts another embodiment of skill based grading within the Return Driven Outcome Generator wagering model of the present invention. Whereas FIG. 1 demonstrates a model of RDOG wagering where a player's skill level determines where the game's average RTP percentage falls within a preset, sub-100 range, FIG. 9 presents a model in which all games begin with an average RTP percentage of 100 as their base 902. In this mode of game play, referred to hereafter as the "full-pay" model, a player's skill is graded not by his ability to perform tasks effectively, but rather by his ability to avoid negative in-game events that interrupt game play. Whenever players playing a full-pay RDOG game fail to avoid an interrupting in-game event, they are assessed a time-based penalty that reduces their potential financial reward 904. All other elements of full-pay RDOG wagering model are identical to the model outlined in FIG. 1.

To demonstrate this model, we will examine a scenario in which a player buys into a full-pay RDOG Pac-Man game by purchasing a 60 second contract for $6. When that player's Pac-Man® collides with a non-blue ghost, he loses a life and his game play is interrupted for a predetermined amount of time. For the purposes of this example, we will set that time penalty at 5 seconds. This period of time in which the player is penalized is not added to his next collision wager. Because every second of game play has a set value in the RDOG model (in this case each second is worth 10 cents), when the player forfeits time by making a mistake, he reduces his returns. By losing 5 seconds, the player has forfeited 50 cents of value from a $6 contract and effectively reduced the average RTP percentage of his game from 100 to 91.7%.

The full-pay model appeals to players because it gives them the opportunity to play a casino game optimally at no disadvantage since mistake-free play results in an average RTP percentage of 100. Rarely in the casino environment are games offered to the player that afford him the opportunity to play legally and face no built-in house advantage. Because players rarely actually play optimally—the casinos have loads of data confirming this reality for video poker—gaming operators have little to fear from putting a full pay machine on their gaming floor.

Regulatory restrictions in many gaming jurisdictions stipulate the minimum average RTP percentage that game operators may assign to a game. Because the full-pay model has no average RTP percentage "floor" and might punish terrible players with perpetual penalties that would slash their returns, a false average RTP percentage floor (i.e., a minimum average RTP percentage) may need to be built into full pay RDOG games, which may be accomplished by assigning to each gaming session a maximum time-based penalty. For example, the Pac-Man® game described earlier may institute a maximum 10 second penalty per 60 second contract, ensuring that the game's average RTP percentage never dips below 83.3% ($5 actually wagered at no disadvantage/$6 in wagers purchased=an average RTP percentage of 83.3%).

The full-pay RDOG model applies cleanly to a variety of arcade style games. Pinball players may face a time penalty when their ball goes into the gutter. Space Invaders players may be penalized when their cannon is hit by alien fire. Race car drivers may be penalized when they crash. Part of the appeal of the full-pay RDOG model according to embodiments of the present invention is that it ties in very naturally with existing arcade game paradigms. Aspects of the full-pay model may be used in conjunction with the embodiments shown and described above, such that the player may be rewarded for successfully colliding with reward generating assets and for successfully avoiding negative in-game events that interrupt game play.

It should also be noted that the time based penalties system demonstrated in FIG. 9 may also be advantageously used in non-full pay games (i.e. games with average RTP percentages other than 100). Operators may input any average RTP percentage they desire into this model including average RTP percentages lower than 100 (to ensure profits) or average RTP percentages higher than 100 (to offer an incentive to players akin to current "optimum play" video poker machines).

Figure 10:
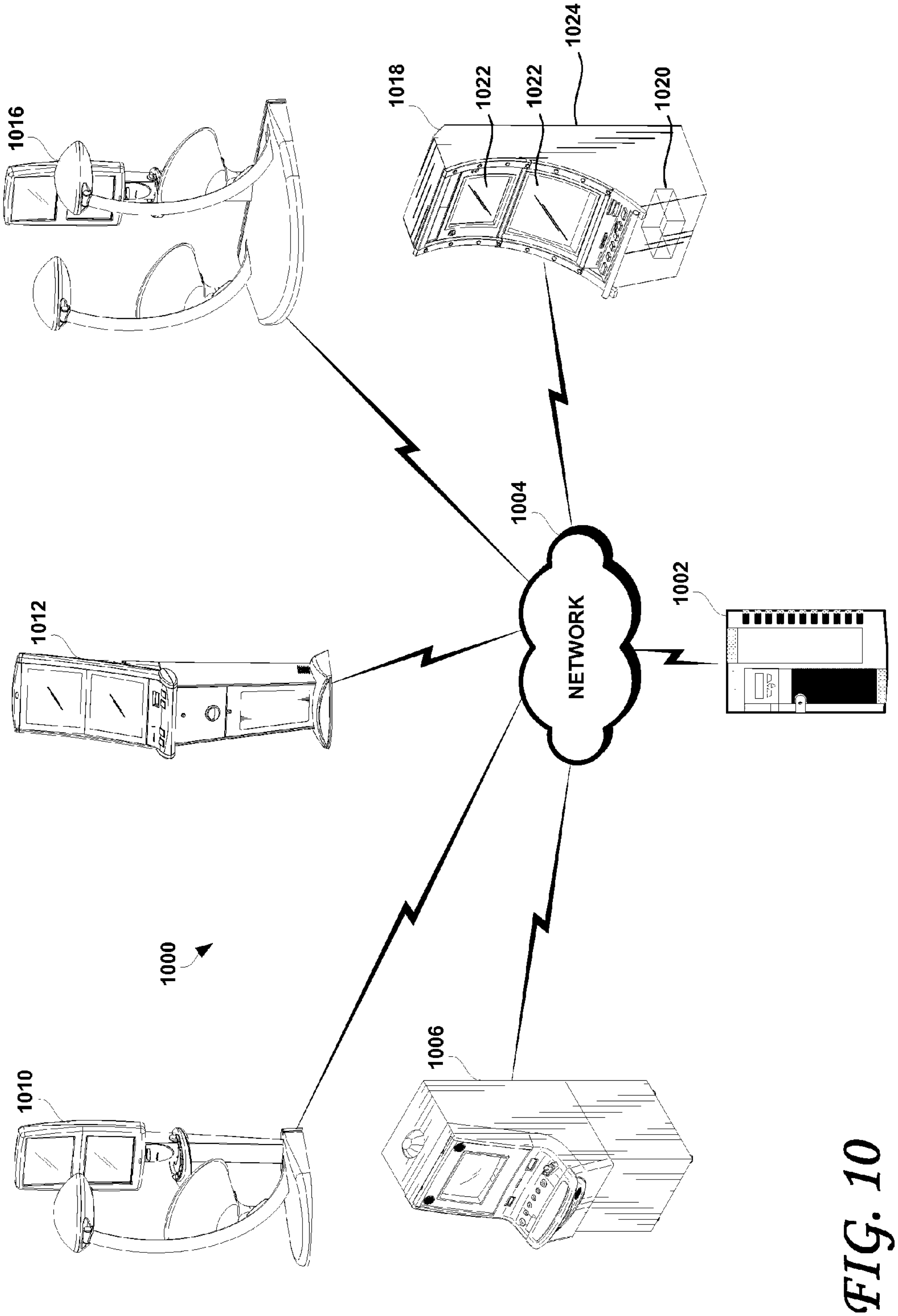
FIG. 10 depicts exemplary gaming machines on which embodiments of the present invention may be practiced.

FIG. 10 illustrates exemplary gaming machines 1006, 1010, 1012, 1016 and 1018 on which embodiments of the present invention may be practiced. These gaming machines are only representative of the types of gaming machines with which embodiments of the present invention may be practiced. In practice, however, there are no limitations on the types of regulated gaming machines on which embodiments of the present invention may be practiced. Embodiments of the present invention may be practiced on gaming machines that are coupled to a central system (e.g., a central server) 1002 and/or on gaming machines that are coupled to other gaming machines over a network, such as shown at 1004. As is known, the gaming machines may also be coupled to a cashier terminal or an automatic cashier (not shown) and/or other devices. The network 1004 may be wired and/or wireless and may include such security measures as are desirable or required by local gaming regulations. Moreover, the gaming machines 1006, 1010, 1012, 1016 and 1018 may be of the traditional cash-in type that includes coins and/or notes acceptors and coins and/or notes dispensers. Alternatively, one or more of the gaming machines 1006, 1010, 1012, 1016 and 1018 may be of the cashless type such as disclosed, for example, in commonly assigned U.S. Pat. No. 6,916,244, the disclosure of which is hereby incorporated herein by reference in its entirety. The gaming machines 1006, 1010, 1012, 1016 and 1018 may be co-located (such as on a casino floor) or widely separated across or within geographical, enterprise, regulatory or functional boundaries. The gaming machines 1006, 1010, 1012, 1016 and 1018 may each include one or more displays 1022, one or more computers 1020 within locked enclosures 1024 suitable for executing one or more regulated games of chance and player interaction mechanisms, devices, and/or other means configured to enable one or more players to interact with the games of chance.

According to an embodiment thereof, a network of gaming machines may be configured to make one or more games available to a player. For example, each gaming machine may be dedicated to a single game implementing the RDOG functionality disclosed herein or may be configured to enable the player to select one of a plurality of RDOG-configured games (and optionally other non RDOG-enabled games as well) to play. Such games may be stored locally on each gaming machine and/or may be downloadable from one or more central server 1018 upon request, as disclosed in application Ser. No. 10/789,975, filed Feb. 27, 2004, which application is hereby incorporated herein by reference in its entirety.

While the foregoing detailed description has described several embodiments of this invention, it is to be understood that the above description is illustrative only and not limiting of the disclosed invention. For example, while several classic video games like Pac-Man® and Space Invaders® were described, the RDOG wagering system could just as easily be applied to any popular video game including new titles like RockStar Gaming's Grand Theft Auto®. Moreover, embodiments of the present invention are not limited to RDOG adaptations of existing video games. Instead, new skill-based games may be developed and provided with RDOG functionalities.

According to other embodiments, events other than player skill (whether under the player's control or not) may also influence the average RTP percentage of a given player game session. Indeed, the average RTP percentage may be increased or decreased depending upon the time of the day or the day of the week or depending upon the length of the contract purchased by the player. Moreover, in video games that are played cooperatively among several players on networked gaming machines, the team's success in attaining the game's objectives may influence the average RTP percentage that is applied to all members of the team. Alternatively, each member of the team may be assigned his or her own average RTP percentage, depending upon his or her skill and/or ability to meet sub-objectives within the game and/or in proportion to his or her contribution to the game mission's outcome.

According to other embodiments, a player's earned average RTP percentage may be saved within his or her saved profile. For instance, each player may be identified by a player loyalty card, and his or her earned average RTP percentage may be saved along with other player-specific data in the player profile stored on the loyalty card or on a central server to which the gaming machines in the casino are coupled. Thereafter, when the player returns to a previously played game, the player may be identified by means of the loyalty card, and that player's average RTP percentage may be retrieved and applied, in combination with the game's RNG to determine the value of the reward multiplier whenever the player collides with a reward generating asset within the game.

According to further embodiments, player characteristics or actions other than skill may influence the average RTP percentage. For example, in the game Bioshock®, published by 2K Games, the player collects weapons, health packs, and Plasmids that give him special powers such as telekinesis or electro-shock, while fighting off the deranged population of the underwater city of Rapture. At times, the player is called on to make quasi-ethical decisions to save or kill (harvest) characters called "Little Sisters" (who resemble lost and frightened little girls) that collect a substance called "Adam" from the dead. The "Adam" collected by a killed Little Sister helps the player survive the toxic game environment. In such a case, the average RTP percentage may be decreased (or increased, for that matter) each time a player makes a decision that, albeit useful in achieving the game's objectives, is ethically questionable or outright wrong. In this regard, it may be seen that embodiments of the present invention may leverage the player's internal conflict of conscience (earn a high average RTP percentage or behave unethically) to great advantage to create compelling escapist game play, while insuring a predictable revenue stream for casino operators. A number of other modifications will no doubt occur to persons of skill in this art. All such modifications, however, should be deemed to fall within the scope of the present invention.

What is claimed is:

1. A regulated gaming machine, comprising:

a display;

a source of random numbers;

a time regulated game displayed on the display, the game including first and second reward generating assets shown on the display and operable within the game during a contract of play time for a player to play the game;

a graphic shown on the display, the graphic being at least partially controlled by the player and being configured to interact under player control with both the first and second reward generating assets within the game during the contract play time; and an outcome generator including a first reward table associated with the first reward generating asset and a second reward table associated with the second reward generating asset, the first reward table being different than the second reward table, the outcome generator is configured such that, when the graphic under player control successfully interacts with the first reward generating asset in the game on the display, a first random number is obtained from the source of random numbers and is used to derive a first reward multiplier from the first reward table, and the outcome generator is configured such that, when the graphic under player control successfully interacts with the second reward generating asset in the game on the display, a second random number is obtained from the source of random numbers and is used to derive a second reward multiplier from the second reward table, and wherein a reward due the player for the graphic successfully interacting with the first reward generating asset is determined by a product of the first reward multiplier and a first collision wager, the first collision wager is dependent upon a time interval since a last successful interaction with the first reward generating asset and graphic under player control during the contract of play time of the game, and wherein a reward due the player for the graphic successfully interacting with the second reward generating asset is determined by a product of the second reward multiplier and a second collision wager, the second collision wager is dependent upon a time interval since a last successful interaction with the second reward generating asset and graphic under player control during the contract of play time of the game.

2. The regulated gaming machine of claim 1, wherein the first reward generating asset is associated with a first average Return To Player (RTP) percentage and wherein the second reward generating asset is associated with a second average RTP percentage that is different than the first average RTP percentage.

3. The regulated gaming machine of claim 1, wherein the first reward generating asset is associated with a first Return To Player (RTP) percentage range and wherein the second reward generating asset is associated with a second RTP percentage range that is different than the first RTP percentage range, at least one of the first Return To Player (RTP) percentage range and the second Return To Player (RTP) percentage range being a fixed range.

4. The regulated gaming machine of claim 1, wherein the first reward generating asset is associated with a first Return To Player (RTP) percentage range and wherein the second reward generating asset is associated with a second RTP percentage range that is different than the first RTP percentage range, at least one of the first Return To Player (RTP) percentage range and the second Return To Player (RTP) percentage range an operator configurable range.

5. The regulated gaming machine of claim 4, wherein the operator configurable range is an average RTP percentage range.

6. The regulated gaming machine of claim 1, wherein at least one of the first reward generating asset and the second reward generating asset is associated with a Return To Player (RTP) percentage range based in part on skill-based grading.

7. The regulated gaming machine of claim 6, wherein a higher Return To Player (RTP) percentage is associated with exhibiting higher skills than with exhibiting lower skills.

8. The regulated gaming machine of claim 6, wherein the highest Return To Player (RTP) percentage and the lowest Return to Player (RTP) percentage are within a preset average RTP percentage range.

9. The regulated gaming machine of claim 1, wherein the first collision wager is determined by a contract cost for playing the time regulated game shown on the display of the gaming machine divided by a duration of the contract play time multiplied by an amount of time between collisions of the graphic under player control with the first reward generating asset during the contract of play time of the game, and wherein the second collision wager is determined by the contract cost for playing the time regulated game shown on the display of the gaming machine divided by a duration of the contract play time multiplied by an amount of time between collisions of the graphic under player control with the second reward generating asset during the contract of play time of the game.

10. A regulated gaming machine, comprising:

a display;

a source of random numbers;

a time regulated game displayed on the display, the game including a reward generating asset shown on the display and operable within the game during a contract of play time for a player to play the game;

a graphic shown on the display, the graphic adapted to be at least partially controlled by a player and being configured to interact under player control with the reward generating asset within the game during the contract play time; and an outcome generator including a reward table associated with the reward generating asset, the outcome generator is configured such that a random number is obtained from the source of random numbers and is used to derive a first reward multiplier from the reward table in response to the reward generating asset successfully interacting with the graphic under player control on the display in the game, wherein a reward due the player for the graphic successfully interacting with the reward generating asset is determined by a product of the first reward multiplier and a collision wager, the collision wager is dependent upon a portion of a time interval associated with the contract of play time for the player to play the game.

11. The regulated gaming machine of claim 10 wherein the collision wager is also dependent upon an amount paid for playing the game.

12. The regulated gaming machine of claim 10 wherein a portion of time used in collision wager determination is an amount of time between successful collisions between the graphic and the reward generating asset.

13. The regulated gaming machine of claim 10 wherein the portion of time used in collision wager determination is an amount of time between a beginning of the game and a first successful collision between the graphic and the reward generating asset.

14. The regulated gaming machine of claim 10, wherein the reward generating asset is associated with an average Return To Player (RTP) percentage.

15. The regulated gaming machine of claim 10 having skill-based grading for grading the performance of play by the player in controlling the graphic in the game, the reward generating asset is associated with a Return To Player (RTP) percentage that is associated with a skill-based grade.

16. A regulated gaming machine, comprising:

a display;

a source of random numbers;

a time regulated game displayed on the display, the game including first and second reward generating assets shown on the display and operable within the game during a contract of play time for a player to play the game;

a graphic shown on the display, the graphic being at least partially controlled by a player and being configured to interact under player control with both the first and second reward generating assets within the game during the contract play time; and an instruction set, executed by the gaming machine, the instruction set causing the gaming machine to:

provide a first scenario within the game during the contract play time including the first reward generating asset and a second scenario within the game during the contract play time including the second reward generating asset, reward generating assets of the first scenario returning, on average, lower rewards upon successful player interaction than are returned upon successful player interaction with reward generating assets of the second scenario, the successful player interaction comprising the graphic under player control successfully interacting with one of the reward generating assets;

make only the first reward generating assets of the first scenario available for interaction with the player during the contract of play time of the game;

determine a level of skill of the player in interacting with reward generating assets of the first scenario during the contract of play time of the game;

determine an average Return-To-Player (RTP) percentage of the game according to the determined level of skill;

make the reward generating assets of the second scenario available for player interaction during the contract of play time of the game only if the determined average RTP percentage is above a predetermined threshold, and determine a reward due to the player upon successful player interaction with the reward generating assets of the first or second scenario during the contract of play time of the game.

17. The regulated gaming machine of claim 16, wherein the instruction set further causes the gaming machine to determine the reward due to the player for successful interaction with a reward generating asset of the first scenario based on a time elapsed during the contract of play time of the game since a last time the player had a successful player interaction with a reward generating asset.

18. The regulated gaming machine of claim 16, wherein determining the reward includes randomly consulting a first reward table to determine a first reward multiplier and multiplying the first reward multiplier with a first collision wager that is dependent upon a time since a last successful player interaction with a reward generating asset of the first scenario.

19. The regulated gaming machine of claim 16, wherein determining the reward includes randomly consulting a second reward table to determine a second reward multiplier and multiplying the second reward multiplier with a second collision wager that is dependent upon a time since a last successful player interaction with a reward generating asset of the second scenario.

* * * * *

UNITED STATES PATENT AND TRADEMARK OFFICE

CERTIFICATE OF CORRECTION

PATENT NO. : 8,628,408 B2
APPLICATION NO. : 12/110132
DATED : January 14, 2014
INVENTOR(S) : Popovich et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1581 days.

IN THE CLAIMS

In Claim 1, Column 18, Line 24, between “contract” and “play” insert --of--.
In Claim 1, Column 18, Line 29, replace “is” with --being--.
In Claim 1, Column 18, Line 35, replace “is” with --being--.
In Claim 1, Column 18, Line 45, replace “is” with --being--.
In Claim 1, Column 18, Line 47, between “and” and “graphic” insert --the--.
In Claim 1, Column 18, Line 53, replace “is” with --being--.
In Claim 1, Column 18, Line 55, between “and” and “graphic” insert --the--.
In Claim 4, Column 19, Line 12, between “range” and “an” insert --being--.
In Claim 8, Column 19, Line 23, replace the second instance of “the” with --a--.
In Claim 8, Column 19, Line 24, replace “the” with --a--.
In Claim 9, Column 19, Line 30, between “contract” and “play” insert --of--.
In Claim 9, Column 19, Line 37, replace “a” with --the--.
In Claim 9, Column 19, Line 38, between “contract” and “play” insert --of--.
In Claim 10, Column 19, Line 50, replace “a” with --the--.
In Claim 10, Column 19, Line 52, after “contract” insert --of--.
In Claim 10, Column 19, Line 56, replace the first instance of “is” with --being--.
In Claim 10, Column 19, Line 65, replace “is” with --being--.
In Claim 15, Column 20, Line 17, replace “the” with --a--.
In Claim 15, Column 20, Line 19, replace “is” with --being--.
In Claim 16, Column 20, Line 30, replace “a” with --the--.

Signed and Sealed this
Twenty-seventh Day of October, 2015

Michelle K. Lee

Michelle K. Lee
*Director of the United States Patent and Trademark Office*

In Claim 16, Column 20, Line 33, between “contract” and “play” insert --of--.
In Claim 16, Column 20, Lines 36 to 37, between “contract” and “play” insert --of--.
In Claim 16, Column 20, Line 39, between “contract” and “play” insert --of--.
In Claim 16, Column 20, Line 51, after “with” insert --the--.